E. GRUENEWALD.
AUTOMOBILE.
APPLICATION FILED JUNE 25, 1912.
1,139,861.
Patented May 18, 1915.
2 SHEETS—SHEET 1.
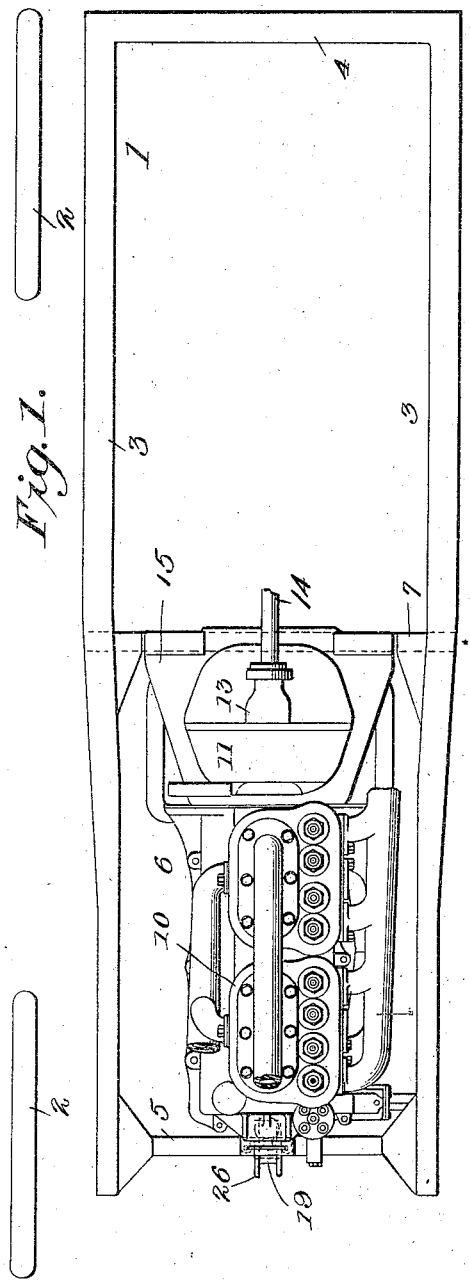
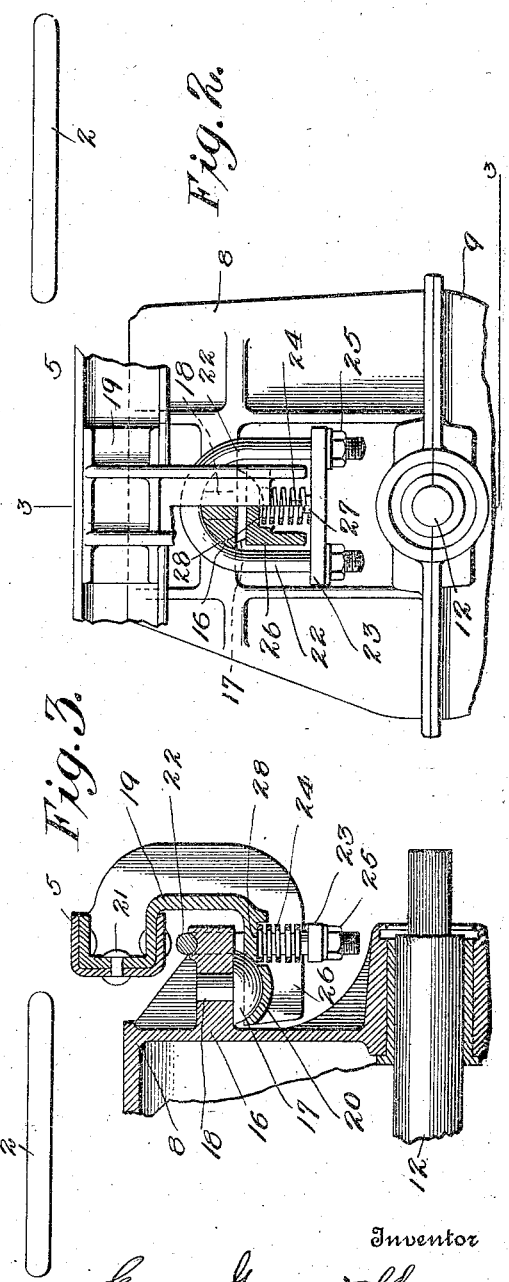
Witnesses
Jo. F. Collins
Stanley M. Cook
Inventor
Eugene Gruenewald
By H. T. Bliss
Attorney E. GRUENEWALD.
AUTOMOBILE.
APPLICATION FILED JUNE 25, 1912.
1,139,861.
Patented May 18, 1915.
2 SHEETS—SHEET 2.
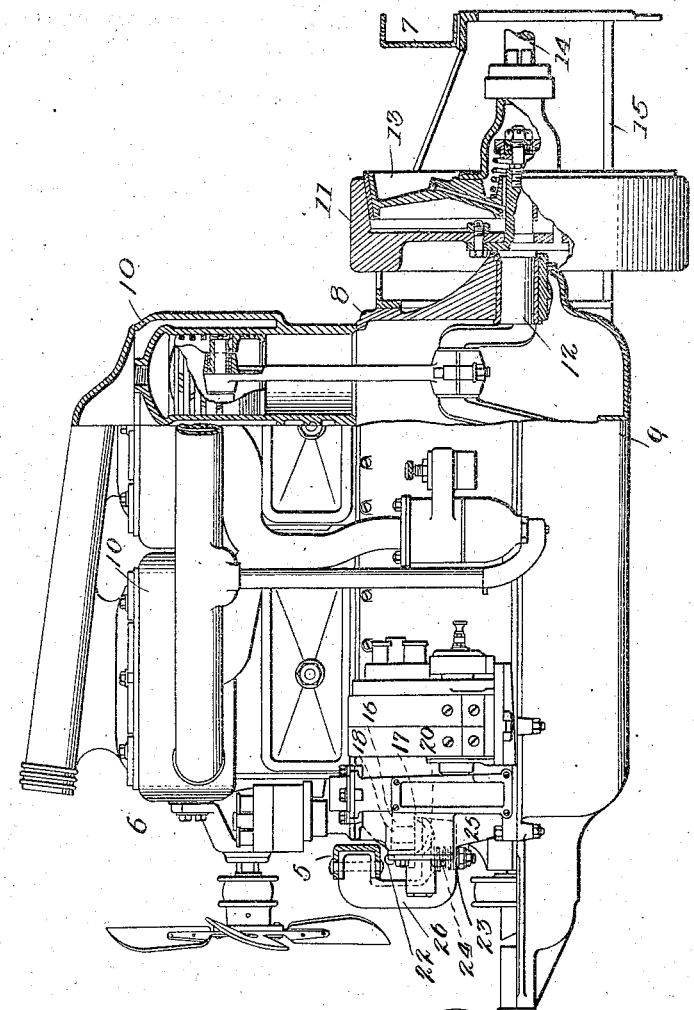
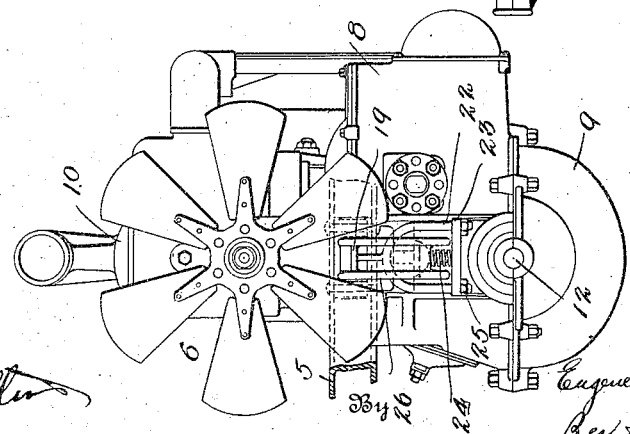
Witnesses
Inventor
Eugene Gruenewald
By H. H. Bliss
Attorney

UNITED STATES PATENT OFFICE.

EUGENE GRUENEWALD, OF MOLINE, ILLINOIS, ASSIGNOR TO MOLINE AUTOMOBILE CO., OF EAST MOLINE, ILLINOIS, A CORPORATION OF ILLINOIS.

AUTOMOBILE.

1,139,861.  Specification of Letters Patent.  Patented May 18, 1915.

Application filed June 25, 1912. Serial No. 705,760.

*To all whom it may concern:*

Be it known that I, EUGENE GRUENEWALD, citizen of the United States, residing at Moline, in the county of Rock Island and State of Illinois, have invented certain new and useful Improvements in Automobiles, of which the following is a specification, reference being had therein to the accompanying drawing.

This invention relates to improvements in motor supports.

It is particularly adapted for use in connection with motors mounted upon a framework which is submitted to twisting and bending strains such as are incurred in motor car structures.

Figure 1 is a plan view of an automobile frame with a motor mounted thereon. Fig. 2 is a front elevation in detail showing the suspension of the front end of the motor. Fig. 3 is a fragmentary vertical longitudinal section on the line 3—3 of Fig. 2. Fig. 4 is a side elevation of a motor with parts broken away. Fig. 5 is an end elevation of the motor showing its front end support.

In the drawings, the numeral 1 indicates the rectangular frame such as is common in all motor vehicles. This framework is resiliently mounted upon ground wheels 2. The frame 1 comprises the two longitudinal parallel bars or channels 3, 3 joined at the rear end by the channel 4 and at the front end by a cross bar 5.

The motor indicated in general by the numeral 6 is shown in the drawings as of the four-cylinder internal combustion type and is supported at its front end upon the center of the transverse piece 5 and at its rear end upon a cross piece 7. The motor is formed about the upper half of its crank case 8, the oil well or lower half of the crank case 9 being detachably secured to the lower edges of the case 8 and the cylinders 10 bolted to the upper portion of the case 8. A fly wheel 11 is mounted upon the rear end of a crank shaft 12 and is connected through a clutch mechanism 13 to a shaft 14 which extends rearward to a transmission which, as it forms no part of the present invention, is not shown in the drawings. Arms 15 extend outward and rearward from the crank case to the transverse bar 7 to which they are secured. This forms a two-point support for the rear of the motor A forward extending lug 16 is cast integral with the casing 8 above the crank shaft 12 and extends to a point directly beneath the cross bar 5 which, in this instance, is shown as of a U-shaped channel section. A vertical opening is formed in the lug 16. A hemispherical head 17 has extending from its flat surface a shank 18 which fits within the opening in the lug 16. The head is placed upon the lug 16 with its curved surface downward. An S-shaped bracket 19 has its upper portion shaped to fit within the channel 5 and its lower portion formed in a socket 20 within which rests the hemispherical head 17. The upper end of the bracket is secured to the channel 5 by means of rivets 21.

The motor resting at its forward point upon the hemispherical head 17 forms a universal connection with the frame through the medium of the socket 20 and the bracket 19. A clevis 22 extends over the top of the front end of the lug 16 and downward over the sides of the bracket 19. Across the lower ends of the clevis is placed a bar 23 which supports a heavy coil spring 24 positioned between it and the lower face of the bracket 19. The lower ends of the clevis are threaded and nuts 25 hold the bar 23 up against the spring. Two wings 26 extend outward from the edges of the bracket 19 so as to further strengthen the structure. A lug 27 formed upon the upper surface of the bar 23, together with a depression 28 on the lower face of the bracket 19, hold the springs securely in place and prevent their displacement. With this arrangement of parts the front end of the motor is supported at a single point by a universal connection. The connection is by means of a half ball and socket which permits of all wear being easily taken up by means of the spring 24. Where this connection is made by means of a ball and socket of the ordinary type, the joint soon shows wear and as the wear cannot be taken up, results in a pounding and inefficient connection. The connection is a flexible one and the amount of friction between the parts may be varied by varying the tension upon the coil spring. The positioning of this semi-ball-and-socket between the motor and the frame at the forward end of the motor with the mounting of the rear end of the motor at two points upon a transverse bar, forms a suspension which allows the frame to be warped or twisted without throwing the shaft out of alinement. By using a clevis straddling the upper part of the connection, the necessity of drilling a hole vertically through the ball and socket for the reception of a bolt is eliminated. In this way the maximum bearing surface between the two parts is obtained and the parts are not weakened by the removal of metal from their centers. In the type of connection in which the semi-ball-and-socket are secured together by a bolt passing directly through the parts, it is evident that any relative movement not in a plane perpendicular to the axis of the bolt will cause a binding or even bend the bolt in such a manner as to materially injure the connection. In my connection these difficulties are eliminated and the ease and rapidity with which the parts may be assembled is greatly increased.

What I claim is:—

1. The combination in a motor vehicle, of the four ground wheels, the main frame supported on the ground wheels, the power plant frame having at one end two transversely opposite points of unyielding connection with the main frame, connecting means interposed between the other end of the power plant frame and the main frame and comprising a hemispherical socket member rigidly secured to one frame and a mating hemispherical ball member rigidly secured to the other frame, the said socket and ball members each having an unbroken spherical surface extending uniformly in all directions from a vertical axis and the member secured to the power plant frame being uppermost, and adjustable means positively engaging the two frames at points adjacent the said socket and ball members and serving to hold the spherical surfaces thereof in contact without limiting relative movement about the common center point.

2. The combination in a motor vehicle, of the four ground wheels, the main frame supported on the ground wheels, the power plant frame having at one end two transversely opposite points of unyielding connection with the main frame, connecting means interposed between the other end of the power plant frame and the main frame and comprising a hemispherical socket member rigidly secured to one frame and a mating hemispherical ball member rigidly secured to the other frame, the said socket and ball members each having an unbroken spherical surface extending uniformly in all directions from a vertical axis and the member secured to the power plant frame being uppermost, and resilient automatically adjustable means positively engaging the two frames at points adjacent the said socket and ball members and serving to hold the spherical surfaces thereof in contact without limiting relative movement about the common center point.

3. The combination in a motor vehicle, of the four ground wheels, the main frame supported on the ground wheels, the power plant frame having at one end two transversely opposite points of unyielding connection with the main frame, connecting means interposed between the other end of the power plant frame and the main frame and comprising a hemispherical socket member rigidly secured to one frame and a mating hemispherical ball member rigidly secured to the other frame, the said socket and ball members each having an unbroken spherical surface extending uniformly in all directions from a vertical axis and the member secured to the power plant frame being uppermost, a yoke engaging one of the frames adjacent the corresponding member and extending vertically beyond the other member, and a compression spring interposed between the yoke and the last said member, whereby the spherical surfaces of the said ball and socket members are held in contact without the limiting of relative movement about the common center point.

4. The combination in a motor vehicle, of the four ground wheels, the main frame supported on the ground wheels, the power plant frame having at one end two transversely opposite points of unyielding connection with the main frame, connecting means interposed between the other end of the power plant frame and the main frame and comprising a hemispherical socket member rigidly secured to one frame and a mating hemispherical ball member rigidly secured to the other frame, the said socket and ball members each having an unbroken spherical surface extending uniformly in all directions from a vertical axis and the member secured to the power plant frame being uppermost, a yoke engaging the power plant frame adjacent the member secured thereto and extending downward therefrom, and a compression spring interposed between the yoke and the member secured to the main frame, whereby the spherical surfaces of the said ball and socket members are held in contact without the limiting of relative movement about the common center point.

5. The combination in a motor vehicle, of the four ground wheels, the main frame supported on the ground wheels, the power plant frame having at one end two transversely opposite points of unyielding connection with the main frame, connecting means interposed between the other end of the power plant frame and the main frame and comprising a hemispherical socket member rigidly secured to one frame and a mating hemispherical ball member rigidly secured to the other frame, the said socket and ball members each having an unbroken spherical surface extending uniformly in all directions from a vertical axis and the member secured to the power plant frame being uppermost, a yoke in the form of an inverted U engaging the power plant frame adjacent the member secured thereto and extending downward therefrom, and a compression spring interposed between the yoke and the member secured to the main frame, whereby the spherical surfaces of the said ball and socket members are held in contact without the limiting of relative movement about the common center point.

6. The combination with a frame, of a motor casing, extensions from the rear of the motor casing connected with the sides of the frame, a downward extending hemispherical head connected to the front of the motor casing, a socket connected with the frame and adapted to receive the hemispherical head, a clevis extending over the said head and below the socket, and a spring interposed between the clevis and the lower side of the socket.

7. The combination in a motor vehicle, of the four ground wheels, the main frame supported on the ground wheels, the power plant frame having at one end two transversely opposite points of unyielding connection with the main frame, a downward projecting hemispherical ball member rigidly secured to the other end of the power plant frame, a mating downward concaved hemispherical socket member rigidly secured to the main frame, a yoke in the form of an inverted U engaging the power plant frame adjacent the said ball member and extending downward therefrom, a cross bar connecting the legs of the yoke below the said socket member, and a compression spring interposed between the cross bar and the lower side of the socket member, whereby the spherical surfaces of the said ball and socket members are held in contact without the limiting of relative movement about the common center point.

8. The combination in a motor vehicle, of the four ground wheels, the main frame supported on the ground wheels, the power plant frame having at one end two transversely opposite points of unyielding connection with the main frame, a horizontally projecting lug rigidly secured to the other end of the power plant frame, a downward projecting hemispherical ball member detachably secured to the lug, a mating downward concaved hemispherical socket member rigidly secured to the main frame, a yoke engaging the power plant frame adjacent the said ball member and extending downward therefrom, and a compression spring interposed between the yoke and the lower side of the socket member, whereby the spherical surfaces of the said ball and socket members are held in contact without the limiting of relative movement about the common center.

In testimony whereof I affix my signature, in presence of two witnesses.

EUGENE GRUENEWALD.

Witnesses:
 E. J. HERBOLSHEIMER,
 D. INGWERSEN.